United States Patent [19]

Toland

[11] 4,068,481

[45] Jan. 17, 1978

[54] SELF-RETAINING ROOF BOLT

[75] Inventor: William G. Toland, San Rafael, Calif.

[73] Assignee: Chevron Research Company, San Francisco, Calif.

[21] Appl. No.: 794,166

[22] Filed: May 5, 1977

[51] Int. Cl.² ............... E21D 21/00; E21D 20/00
[52] U.S. Cl. ..................... 61/45 B; 52/232; 85/63
[58] Field of Search ........... 61/45 B, 63; 85/63; 52/232, 155, 166

[56] References Cited

U.S. PATENT DOCUMENTS

| 3,855,742 | 12/1974 | Jeter | 52/232 |
| 3,936,924 | 2/1976 | Ichise et al. | 61/45 B |

Primary Examiner—Paul R. Gilliam
Assistant Examiner—Alex Grosz
Attorney, Agent, or Firm—D. A. Newell; John Stoner, Jr.; W. Keith Turner

[57] ABSTRACT

A self-retaining roof bolt comprising an elongated U-shaped member having a pair of spaced legs which support a flat plate fitted over the U-shaped member and are held under transverse tension at ambient temperature by a grouting which becomes malleable at elevated temperatures. The roof bolt is installed in a roof hole by momentarily heating the leg sections, which causes the grouting to soften, releasing the tension on the legs and allowing them to separate and wedge against the roof hole walls. Thus, the bolt retains itself in the roof hole while the grouting cools. Upon cooling, the grouting re-solidifies, firmly securing the bolt.

9 Claims, 2 Drawing Figures

4,068,481

SELF-RETAINING ROOF BOLT

BACKGROUND OF THE INVENTION

The invention concerns an improved self-retaining roof bolt.

Roof bolts are used in underground mining operations to help support tunnel roofs. Present practice is to drill an approximately 1-inch diameter hole 4 to 6 feet into the tunnel roof. Holes are usually drilled about every 2 feet. The hole is first filled by inserting a rod into the hole and then the face is sealed with a plate. The space between the rod and the wall of the hole is then filled with a cement or resin securing the rod and plate.

The need to support the bolt in the hole until the rod is secured by the cement or resin significantly slows the installation of new bolts and increases the cost of each bolt. For instance, the total in-place cost in a typical mining operation has been estimated at about $12 per bolt, approximately 25% of the total mining cost. Accordingly, a system which might reduce the cost of in-place roof bolts would provide significant savings. One means of reducing the cost of installing roof bolts would be to provide a bolt which does not require external support during the cementing process.

SUMMARY OF THE INVENTION

This invention provides an self-retaining roof bolt and method of installation. The roof bolt, described in detail hereinafter, comprises: (1) an elongated U-shaped member having a pair of spaced leg sections depending from the connected portion of said U-shaped member, said leg sections being formed to support a flat plate fitted over said U-shaped member; (2) a coat of grouting on said U-shaped member which maintains said leg sections under transverse tension at ambient temperature, said grouting being malleable at elevated temperature; (3) a flat plate member having an opening therein positioned over said U-shaped member and supported by said leg sections, said opening being large enough to permit said leg sections to move transversely on release of said transverse tension to maintain said U-shaped member in place of a roof hole; and (4) a gasket member abutting said flat plate member and in sealing engagement with said U-shaped member to prevent flow of said grouting below said plate member at elevated temperature.

In its method embodiment, this invention provides a method for installing the above-summarized roof bolts by inserting a bolt in a roof hole, and momentarily heating the leg sections. This elevates the temperature of the grouting which becomes malleable releasing the tension on the legs and allowing them to separate and wedge against the roof hole walls.

BRIEF DESCRIPTION OF THE FIGURES

The Figures show preferred embodiments of the roof bolt of this invention in partially cut-away perspective view.

DETAILED DESCRIPTION OF THE INVENTION

The present invention concerns a self-retaining roof bolt comprising four members. Each member of the bolt serves a necessary function, but none of the members is restricted by its function to a particular material or configuration. Accordingly, there are numerous embodiments of the invention which will become apparent from the following detailed description.

Figure 1:
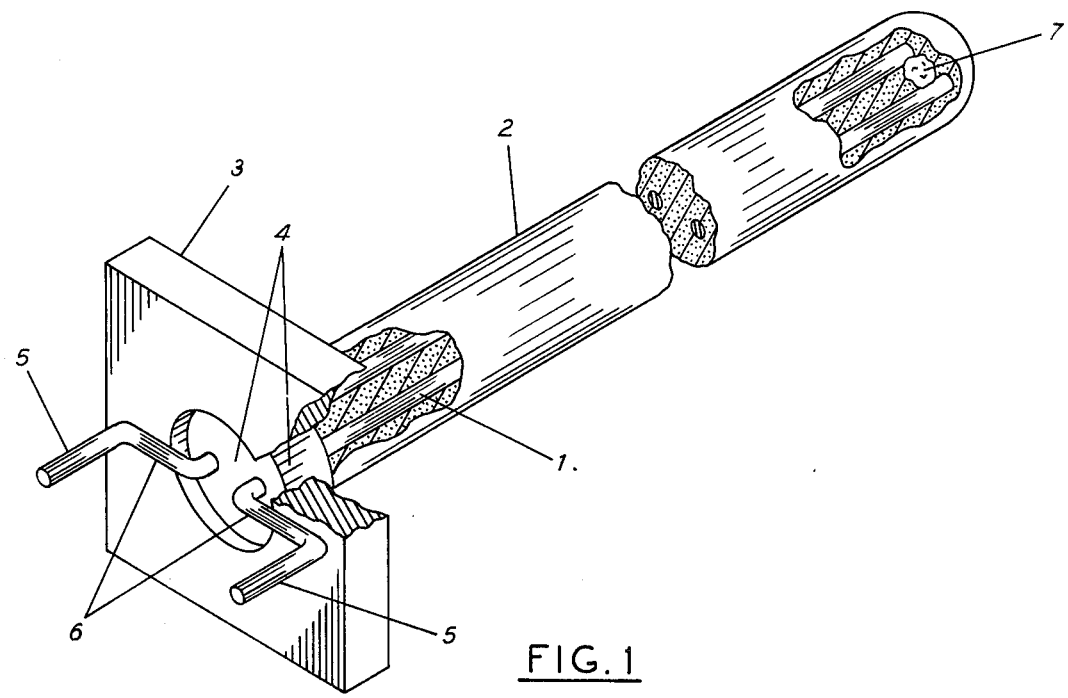
Figure 2:
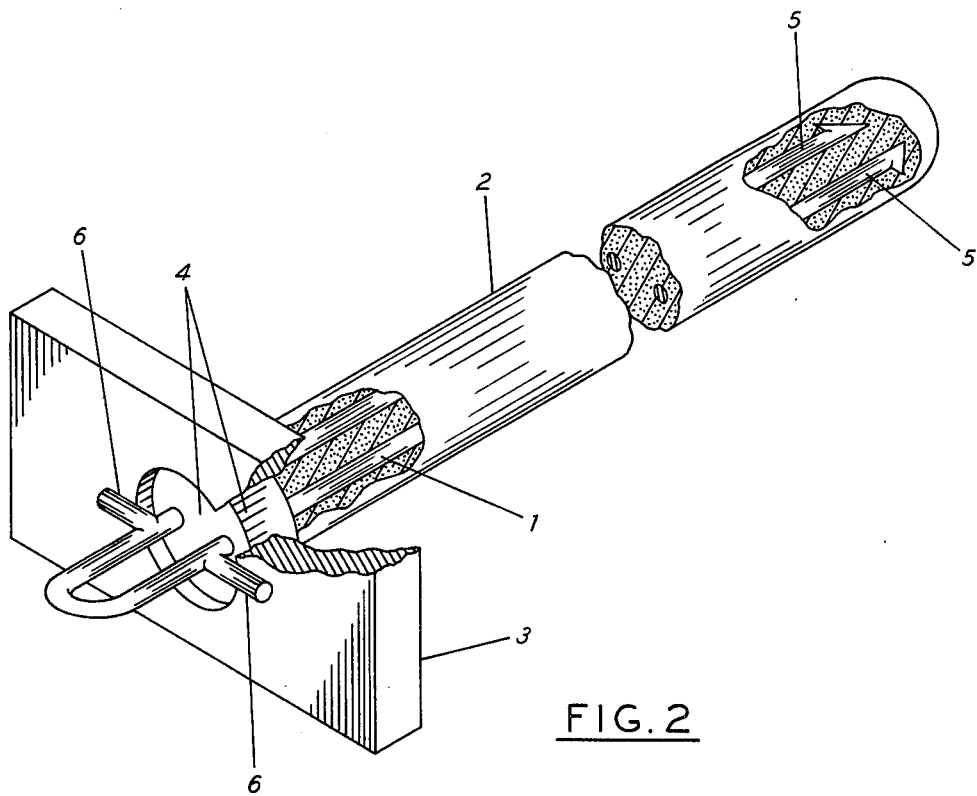

The first member of the roof bolt is an elonaged U-shaped member having a pair of spaced leg sections depending from the connected portion of the U-shaped member. The leg sections are formed to support a flat plate fitted over the U-shaped member. Referring to the embodiment illustrated in FIG. 1, elongated U-shaped member 1 has depending leg sections 5 with their free ends 6 bent in opposing directions at an angle of approximately 90° to the longitudinal centerline of the U-shaped member to support plate 3. The member is U-shaped by virtue of connection 7, at the closed end of the bolt. Alternative suitable configurations for the U-shaped member are readily apparent. For example, referring to FIG. 2, elongated U-shaped member 1 has depending leg sections 5 with spurs 6 to support plate 3. The configuration can be varied so long as the member has at least two leg sections which can be maintained under transverse tension, and are formed to support a flat plate fitted over the member. The closed end can be, for example, connected by a spot weld as in FIG. 1 or by a continuous bend as in FIG. 2.

The material chosen for use in the construction of the U-shaped member should be capable of withstanding both shear forces and compression forces. The strength of the bolt will depend primarily upon the strength of this member. The material should also be one which can be formed in a U-shape and placed under tension by compressing the leg sections. In addition, the material should have a heat-transfer coefficient which insures that the leg sections can be readily heated and will transfer sufficient heat to readily elevate the temperature of the grouting, causing it to become malleable, thereby releasing the tension on the leg sections. Suitable materials include metallics such as steel rebar or aluminum rod. Fiberglass rods can be used in conjunction with the heat-conducting metal to reduce weight. Steel rebar is a preferred material due to its availability and superior shear resistance.

The second member of the roof bolt is a grouting coat which is applied to the leg sections of the U-shaped member and maintains the leg sections of the U-shaped member under transverse tension at ambient temperature.

Referring to the Figures, grouting coat 2 must be sufficiently firm at ambient temperature to maintain tension on the U-shaped member, but must also become malleable when heated to allow installation by releasing the tension on the leg sections of the U-shaped member.

It is also desirable for the grouting to have some adhesive properties. Such groutings serve to cement the roof bolt in position. Thus, when the grouting is heated and becomes malleable, the leg sections of the U-shaped member wedge against the wall of the roof hole retaining the bolt in position; and then, as the grouting cools it forms to the hole cementing the bolt in place.

A variety of suitable grouting materials are known in the art. The sulfur-based coating compositions and foams described in U.S. Pat. No. 4,026,719, which issued from application Ser. No. 631,781, and U.S. Pat. No. 3,892,686, which issued from application Ser. No. 344,694, respectively, (the disclosures of which are incorporateed herein by reference) are particularly useful. Other suitable groutings include, for example, thermoplastics such as the polyethylenes, polypropylene, acrylic resins, nylons, acetal resins, polyurethane resins, and the like. The properties of these and other suitable thermoplastics are thoroughly described in "Polymer Handbook", Brandrup and Immergut (Eds.), Interscience Publishers, 1966, at pages IX-1 through IX-7.

The U-shaped member can be coated in any number of ways. In general, the free ends of the leg sections of the U-shaped member are compressed to put the leg sections under transverse tension; and the leg sections are then sufficiently coated to maintain them under tension at ambient temperature. The grouting can be applied as a liquid by melting it and pouring or spraying it around the U-shaped member, which is being held in a suitable mold. When a sufficient thickness is obtained, the coating is allowed to cool and solidify. Alternatively, the coat can be pre-cast as a sleeve, and then slipped over the U-shaped member while it is under tension. This latter method requires care to insure that the hollow core of the pre-cast sleeve of coating is correctly sized to hold the leg sections of the U-shaped member under tension.

The coating is preferably not applied to the portion of the U-shaped member which is formed to support the flat plate since it will extend beyond the roof hole. The viscosity of the coating when heated is preferably adjusted to prevent the coating from running into openings or cracks in the roof hole so far as to consume too much of the coating to permit filling as much of the hole as possible. On the other hand, the coating must not be so viscous when heated to prevent flow to obtain adequate contact with the hole surfaces.

The final members of the roof bolt are the plate member and flexible gasket member. The gasket member and plate member abutt to form a seal which prevents the grouting from flowing out of the roof hole when heated. Referring to the Figures, plate 3 and gasket 4 have centrally located holes and are positioned over the coated U-shaped member resting on the leg sections of the U-shaped member. The gasket engages both the plate and the coated U-shaped member to seal the gaps between the plate and the U-shaped member. In a typical embodiment of the roof bolt, the plate and gasket members are positioned to complete the bolt after the U-shaped member is coated and its leg sections are under transverse tension. Alternatively, the gasket and plate members can be positioned around the U-shaped member prior to coating.

The hole in the plate must be large enough for the leg sections of the U-shaped member to separate when the restraining force is released, i.e., grouting is heated, and wedge against the walls of the roof hole. The gasket, obviously, seals the hole. The shape and relative size of the plate are not critical. Similarly, the plate, while typically steel, might also be wood, plastic or other metallic alloy.

As an alternative embodiment, several flexible strips might be attached at or near the top of the U-shaped member, somewhat like an umbrella frame. These strips would further secure the bolt. Similarly, the U-shaped member could be fashioned with barbs or bends, as in FIG. 2, to aid in securing the bolt. Such embodiments would reduce the burden on the leg sections of the U-shaped member to initially secure the bolt.

The roof bolt is installed in a roof hole by inserting it in the hole and heating the exposed portion of the leg sections of the U-shaped member long enough to elevate the temperature of the grouting causing it to flow. Where the free ends of the U-shaped member are exposed, heating can be done by passing a high amperage, low voltage current through the U-shaped member of the bolt. Alternatively, heating can be accomplished by a direct flame. When heated, the grouting will flow by gravity to fill voids between the hole and the bolt. At the same time the restraining force exerted by the grouting on the leg sections of the U-shaped member will be released and the leg sections will separate and wedge against the sides of the hole. Thus, the roof bolt is held in the hole without the use of a support until the grouting cools and resolidifies cementing the bolt in place.

It can be seen that during installation of the bolt, the grouting coat will drain downwardly in order to fill the cavity. Depending upon the volume of the void spaces to be filled, the portion of the U-shaped member which is exposed at the inserted end will vary. In order to minimize this exposure, it is preferable to have a close tolerance between the bolt size and the hole size.

What is claimed is:

1. A self-retaining roof bolt comprising:
   a. an elongated U-shaped member having a pair of spaced leg sections depending from the connection portion of said U-shaped member, said leg sections being formed to support a flat plate fitted over said U-shaped member;
   b. a grouting coated on said U-shaped member to maintain said leg sections under transverse tension at ambient temperature, said grouting being malleable at elevated temperatures;
   c. a flat plate having an opening therein positioned over said U-shaped member and supported by said leg sections, said opening being large enough to permit said leg sections to move transversely on release of said transverse tension a sufficient amount to maintain said U-shaped member in place in a roof hole; and
   d. a gasket abutting said flat plate member and in sealing engagement with the lower portion of said U-shaped member to prevent flow of said coating below said plate at elevated temperature.

2. A roof bolt in accordance with claim 1 wherein the free ends of the leg sections are formed in opposing directions at an angle of approximately 90° to the longitudinal centerline of the U-shaped member.

3. A roof bolt in accordance with claim 2 wherein the coating is a sulfur-based compositon.

4. A roof bolt in accordance with claim 2 wherein the closed end of the leg sections is formed as a continuous bend.

5. A roof bolt in accordance with claim 4 wherein the U-shaped member is steel.

6. A roof bolt in accordance with claim 1 wherein the bolt is 4 to 6 feet in length and about 1 inch in diameter.

7. A roof bolt in accordance with claim 1 wherein the flat plate is steel.

8. A method of installing the roof bolt defined in claim 1 which comprises heating the free ends of the leg sections of the U-shaped member of the bolt until the grouting becomes malleable releasing the tension on the leg sections of the U-shaped member causing the leg sections to wedge against the roof hole and flowing to substantially fill the voids between the hole walls and the bolt.

9. A method according to claim 8 wherein heating is accomplished by passing an electrical current through the U-shaped member.

* * * * *